United States Patent [19]

Dearden et al.

[11] Patent Number: 4,629,223

[45] Date of Patent: Dec. 16, 1986

[54] PIPE CONNECTOR

[75] Inventors: Geoffrey C. Dearden; Edward J. Speare, both of Bedford; Katsuo Ueno, Hertfordshire, all of England; Donald N. Jones, Aberdeenshire, Scotland

[73] Assignees: Hunting Oilfield Services (UK) Limited, Aberdeen, Scotland; Kawasaki Steel Corporation, Kobe, Japan

[21] Appl. No.: 646,897

[22] Filed: Aug. 31, 1984

[30] Foreign Application Priority Data

Sep. 6, 1983 [GB] United Kingdom ............... 8323858

[51] Int. Cl.⁴ .......................................... F16L 15/00
[52] U.S. Cl. ..................................... 285/334; 285/390
[58] Field of Search ................. 285/332.2, 333, 334, 285/351, 355, 390

[56] References Cited

U.S. PATENT DOCUMENTS

| Re. 30,647 | 6/1981 | Blose | 285/332.2 |
| 1,927,656 | 9/1933 | Eaton et al. | 285/334 |
| 2,187,798 | 1/1940 | Texter | 285/390 |
| 2,204,754 | 6/1940 | Frame | 285/334 |
| 3,359,013 | 12/1967 | Knox et al. | 285/334 |
| 3,489,437 | 1/1970 | Duroet | 285/332.2 |
| 3,574,373 | 4/1971 | Le Derf | 285/333 |
| 4,384,737 | 5/1983 | Reusser | 285/351 |

FOREIGN PATENT DOCUMENTS 2064041  7/1981  United Kingdom .

Primary Examiner—Cornelius J. Husar
Assistant Examiner—Eric K. Nicholson
Attorney, Agent, or Firm—Balogh, Osann, Kramer, Dvorak, Genova & Traub

[57] ABSTRACT

A connector, for example for connecting a tubular member such as a pipe, comprises a male member which has an external frusto-conical surface provided with a thread and a female member having an internal frusto-conical surface provided with a thread for engagement will the thread of the male member. The members are provided with generally radially directed sealing surfaces which are brought into sealing abutment under an axially directed compressive force when the members are fully engaged together. To improve the loading of the threads of the members on engagement of the members and on application of a tensile load to the engaged members, the axial thickness of the thread of at least one of the members in one or both of the portions of the thread adjacent the ends thereof is reduced to increase the flexibility of the thread and therefore reduce the load sustaining ability of the thread. Specifically the reduction in the axial thickness is greatest at the end of the thread and progressively decreases away from the end. This reduction is achieved by providing threads having leading flanks with a constant pitch and trailing flanks whose pitches are varied to provide the required variation in axial thickness.

In the preferred embodiment, the thread of the male member adjacent its free end is reduced in axial thickness and the thread of the female member adjacent its free end is reduced in axial thickness.

22 Claims, 7 Drawing Figures

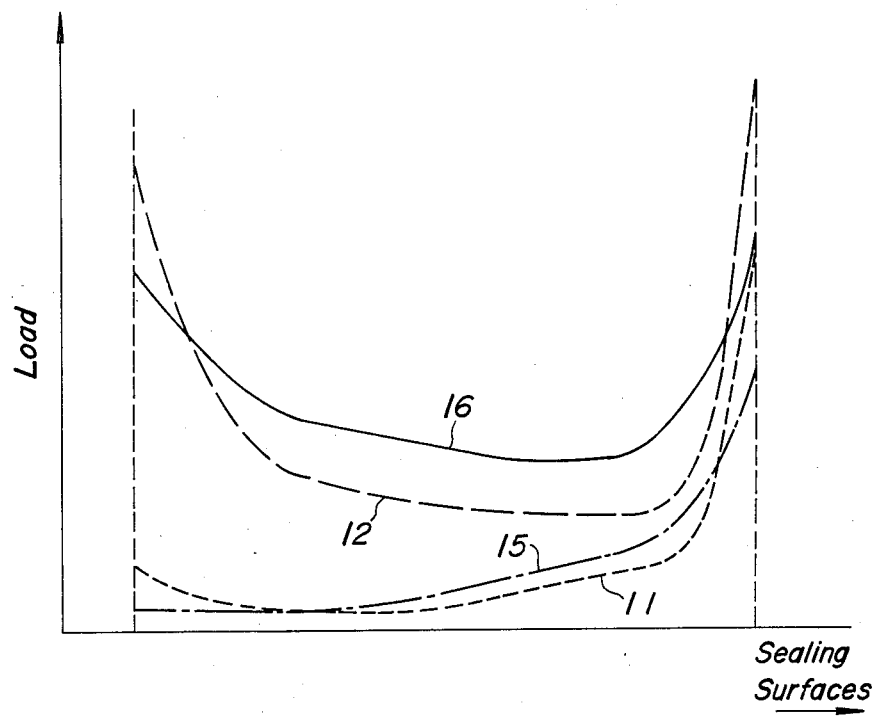
FIG_2

FIG_6
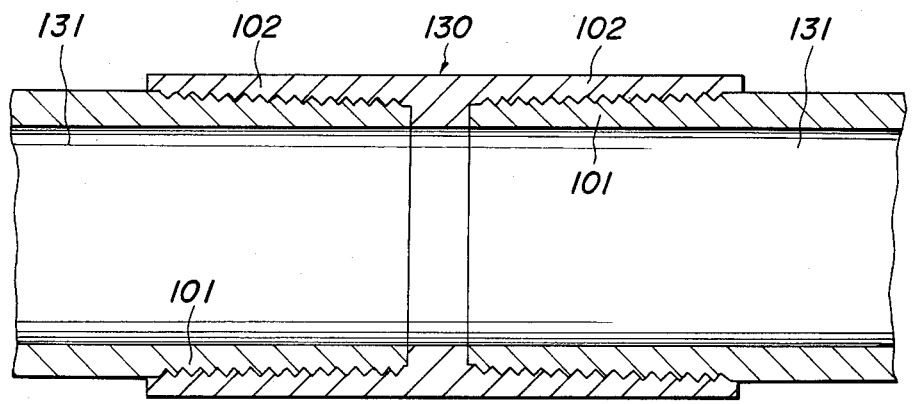
FIG_7
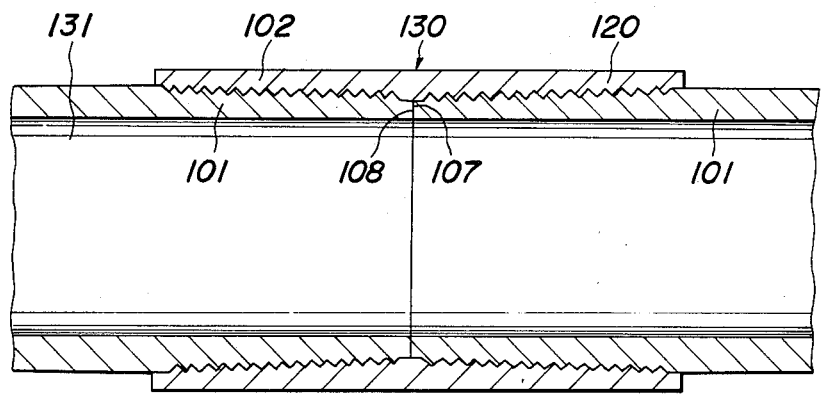

PIPE CONNECTOR

BACKGROUND OF THE INVENTION

1. Field of the Invention

The present invention relates to pipe connectors for connecting members, such for example as pipes particularly but not exclusively for use in conveying pressurized fluids for example in oil and gas exploration and production.

2. Description of the Prior Art

The main type of pipe connector presently used in oil and gas exploration and production for connecting tubings and casings comprises a female member having an internal frusto-conical circumferential surface provided with a thread of constant pitch, and a male member having an external correspondingly frusto-conical circumferential surface and provided with a thread having the same pitch as the thread of the female member and for threaded engagement with the female member. Sealing of the connector is obtained by causing a generally axially directed sealing surface on the free end of the male member to abut against a corresponding sealing surface of the female member under an axial compressive force. This force is obtained by screwing the members together tightly causing compression of the male member and tensioning of the female member and is usually maintained by providing an interference fit between crest and root surfaces of the threads.

Pipe connectors of this type have been found to have a number of substantial disadvantages. The axial compressive stress in the male member and the associated tensile stress in the female member required to force the sealing surfaces into sealing contact is borne predominantly by only the last few turns of the thread adjacent the sealing surfaces, the remainder of the turns of the thread being at most very lightly loaded. Consequently the load bearing leading flanks of the loaded turns of the thread experience substantial loads while sliding relative to one another to bring the sealing surfaces into compressive contact. Additionally, while increasing the radial interference between the threads of the members will reduce the tendency of the members to unscrew or back-off, the resulting hoop stresses in the female member, particularly when increased under the influence of internal pressure, can exceed the stresses at which the material of the member will yield. Furthermore high hoop stresses and high flank loading can produce galling of the thread surfaces.

The relatively short axial distance between the load bearing turns of the threads and the sealing surfaces limits the strain energy induced in the members so that a slight relative axial movement of the members of the connector can significantly reduce the integrity of the seal between the sealing surfaces. Not only is the strain energy limited but also the angle through which the members are rotated in producing the sealing force on the sealing surfaces is limited so that any slight tendency of the members to unscrew or back-off, for example resulting from a lateral blow to one of the members, will cause a significant reduction in the compressive loading of the sealing surfaces.

SUMMARY OF THE INVENTION

It is a primary object of the invention to provide an improved pipe connector which eliminates all the disadvantages above described.

It is another object of the invention to provide a pipe connector capable of uniformly distributing load such as tensile or compressive forces acting upon male and female members of the connector to greatly reduce the maximum load on flanks of turns of threads formed in the members, thereby enhancing the fatigue life of the connector.

It is a further object of the invention to provide a pipe connector capable of uniformly distributing load such as tensile or compressive forces acting upon male and female members of the connector so as to rotate the members through a substantially greater angle than with the known connector to achieve a required loading on sealing surfaces of the members, thereby preventing loss of integrity of seal provided by sealing surfaces only by a relatively small angular rotation of the members.

According to the present invention there is provided a connector for connecting tubular members comprising a female member having an internal circumferential surface provided with a thread, and a male member having an external circumferential surface provided with a thread for threaded engagement with the thread of the female member, the male member being provided adjacent one end of the said threaded surface thereof with an annular facing axially sealing surface which is, when the male and female members are fully engaged together with part at least of one leading flank of each thread in load bearing abutment with a corresponding leading flank of the other thread, brought into abutment with an annular facing axially sealing surface associated with the female member under an axially directed force, wherein the pitches of the leading flanks of the threads are the same and constant throughout the axial extents of the threads and the axial thickness of the thread of one of the members in one end portion adjacent the sealing surface thereof is reduced relative to the axial thickness of the thread adjacent the end portion to increase the flexibility of the thread.

Advantageously, the reduction in axial thickness of the thread of the one member is greatest at the one end of the threaded surface adjacent the sealing surface and progressively reduces in the direction of the other end of the threaded surface. Preferably between about a third and one half of the thread of the one member have a reduced axial thickness.

This reduction in thickness is preferably obtained by making a thread having leading and trailing flanks with the same constant pitch and then cutting material from the trailing flank of the thread so as to provide the trailing flank with a constant pitch which is larger or smaller than that of the pitch of the leading flank of the thread.

The male member may be formed on the end of a member to be connected thereby or may be made separately and may be fixed, for example permanently, e.g. by welding, or otherwise, to the end of the member, and the female member similarly may be formed on the end of a member to be connected thereby or may be made separately and fixed or otherwise connected to the member. The female member may be made integral with or otherwise fixed to part of another connector for connection to the member. When the female member is made separately, the sealing surface associated therewith may be provided either by a surface of the member itself or by a surface of a member already engaged with the female member.

The circumferential surfaces of the members may be cylindrical or frusto-conical and tapering towards the free end of the male member.

The sealing surfaces may be provided at or adjacent the free end of the male member and internally in the female member, or may be provided at or adjacent the free end of the female member and by an external surface on the male member. The surfaces may extend in radial planes or may be frusto-conical or curved, e.g. convex or concave, or in part radial and/or frusto-conical and/or curved. The surfaces may have the same shape or may be differently shaped and deformed into full abutment on full engagement of the members. For example the sealing surfaces may be as described in either of copending U.K. applications Nos. 8323508 and 8414203.

Preferably where the sealing surface of the male member is provided at or adjacent the free end thereof, the axial thickness of the thread of the male member adjacent the sealing surface is reduced. Where the sealing surface associated with the female member is provided at or adjacent the free end thereof, the axial thickness of the thread of the female member adjacent the sealing surface is reduced.

To improve the distribution of the load along the thread on application of an axial tensile load to a made-up connector, the axial thickness of the thread of one of the members adjacent the other end of the threaded surfaces may also be reduced, the reduction adavantageously being greatest in the end turn and progressively reducing in the direction of the one end of the threaded surfaces.

This reduction in axial thickness of the thread at the other end of the threaded surfaces may be obtained in exactly the same way as at the one end of the threaded surfaces.

Preferably, where the sealing surface of the male member is provided at or adjacent the free end thereof, the axial thickness of the thread of the female member adjacent the free end thereof is reduced. Where the sealing surface of the female member is provided at or adjacent the free end thereof, the axial thickness of the thread of the male member adjacent the free end thereof is reduced.

The above described reduction in axial thickness of the thread may however be applied to one or other or both of the members in the portions adjacent the ends of the threaded surfaces.

It is of note that, while the above-described reduction in axial thickness of the thread may be described hereinafter in terms of reduction in axial thickness of the thread turns, it should be given the same meaning as above, namely, reduction in the axial thickness of the thread.

The threads of the members may be dimensioned to provide a clearance contact or interference between the crest surface of one of the threads and the corresponding root surface of the gap between adjacent turns of the other thread, a clearance being provided between the crest surface of the other thread and the root surface of the gap between adjacent turns of the one thread.

Embodiments according to the present invention will now be described by way of example only, with reference to the accompanying drawings.

BRIEF DESCRIPTION OF THE DRAWINGS

FIG. 2 is a graph showing the load on each thread turn for a known type of pipe connector as shown in FIG. 1 and for an embodiment of pipe connector according to the present invention;

FIGS. 6 and 7 are diagrammatic sectional views of further embodiments of pipe connectors according to the present invention.

DETAILED DESCRIPTION OF THE PREFERRED EMBODIMENT

Figure 1:
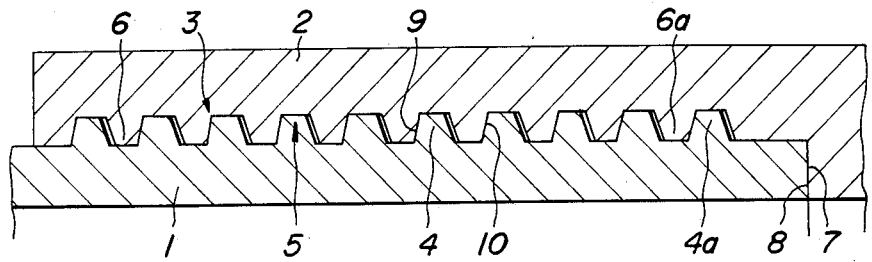
FIG. 1 is a diagrammatic part sectional view of a known type of pipe connector.

The known pipe connector shown very diagrammatically in FIG. 1 comprises a male member 1 which is made or formed integrally with the end of a pipe, and a female member 2 which forms part of a sleeve, and the other end of which is similarly associated with another male member. The male member 1 has an external frusto-conical surface 3 provided with a thread 4 having a constant pitch throughout its length. The female member 2 has an internal frusto-conical surface 5, corresponding to surface 3, and provided with a thread 6 having the same pitch as thread 4. The free end of male member 1 has an annular radial sealing surface 7 which, when the members are fully engaged together, is in abutment with an internal annular radial surface 8 on the female member 2.

To make up the above connector, the members 1, 2 are screwed together until the surfaces 7, 8 are brought into abutment, at which point the leading flanks 9, 10 of the threads 4, 6 respectively are also in abutment. The members are then further screwed together to load the abutted surfaces 7, 8. The reactive force is mainly taken by the flanks 9, 10 of the first turn 4a, 6a of the threads 4, 6 with substantially less load being taken by the 2nd, 3rd etc. turns. The dotted lines 11 of FIG. 2 shows the load taken by the thread turns starting with the turn at the free end of the female member. The effect of loading surfaces 7, 8 is to compress the male member and correspondingly tension the female member and to thereby store energy. However the main compression and tension takes place between those thread turns which bear the substantial part of the load and the sealing surfaces 7, 8, and therefore a relatively short length at the free end of the male member is compressed to any substantial degree.

Because of this disadvantageous load distribution along the threads 4, 6 as described above, the relative angle through which the members are rotated to achieve loading of the surfaces 7, 8 is relatively small. It will thus be appreciated that a relatively small angular rotation of the members tending to unscrew the members will substantially reduce the integrity of the seal provided by surfaces 7 and 8. The resistance to unscrewing is provided by friction between the leading flanks 9, 10 of the threads and is increased by creating an interference fit between the crest and root surfaces of the threads but, again, there is a limit to the degree of interference that can be provided because of the consequential hoop stresses in the members and the risks of galling of the surfaces of the threads.

Finally, when the above connector is subject to an axial tensile stress, the effect is mainly borne by the turns of the threads at the two ends of the threaded surfaces, as shown by the broken line 12 in FIG. 2. Particularly where one of the members has, at the end remote from surfaces 7, 8 a vanishing thread so that the area of contact between the leading flanks of the teeth is substantially reduced particularly in the last few turns, the imposition of substantial loads on application of an axial tensile force, can cause the female member to "unzip" or deform radially outwardly providing the potential for failure of the connector.

Figure 3:
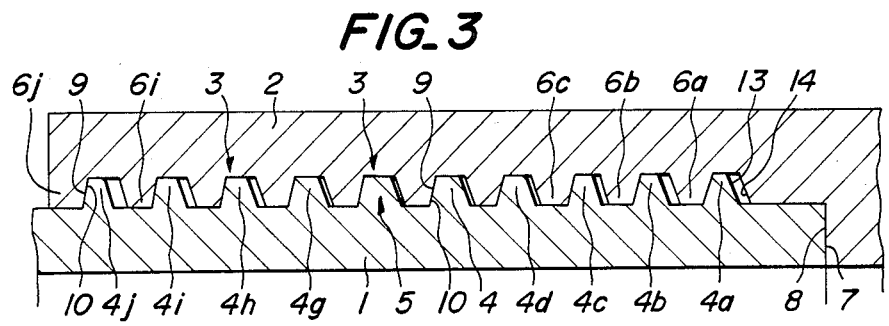
FIG. 3 is a diagrammatic part sectional view of an embodiment of pipe connector according to the present invention.

An embodiment of a connector according to the present invention for connecting pipes is shown diagrammatically in FIG. 3 and parts corresponding to those of the known connector of FIG. 1 are designated by the same reference numerals. Specifically, the connector comprises a male member 1 provided with an external peripheral frustoconical surface 3 which is provided with a thread 4, and a sealing surface 7, and a female member 2 provided with an internal circumferential frusto-conical surface 5 with a thread 6, and a sealing surface 8. The threads 4, 6 have leading flanks 9, 10, which have the same and a constant pitch throughout the axial extent of the threads, and trailing flanks 13, 14. In the portion of the members 1, 2 adjacent sealing surfaces 7, 8 the axial width of the turns of the thread of at least one of the members is reduced, the reduction being greatest in the end turn and progressively reducing in the direction of the other end of the surface. As shown in FIG. 3, the axial width of turns 4a, 4b, 4c and 4d of thread 4 of the male member 1 is reduced.

This reduction in width is achieved by first producing a thread 4 on member 1 for which both the leading and trailing flanks 9, 13 have the same and a constant pitch throughout. Thereafter material is removed from the trailing flanks 13 of those thread turns whose axial width is to be reduced to provide the trailing flank of this portion of the thread with a different and smaller pitch than the pitch of the leading flank of the thread.

With the above described arrangement, when the members 1, 2 have been screwed together sufficient to bring surfaces 7, 8 into abutment, the leading flanks 9, 10 of the threads are in abutment at least in the region of the sealing surfaces. Further tightening of the connector will load the thread turns starting with the first turns 4a, 6a closest to sealing surfaces 7 and 8. The reduction in thickness of thread turn 4a is such that it will flex so that it will not sustain as much load as it would otherwise sustain, so that the load is transmitted axially to runs 4b, 6b. Turn 4b will in turn flex to transmit part of the load to turns 4c, 6c etc. The effect of this is that less load is borne by turns 4a, 6a, 4b, 6b . . . than in the known connector and the load is spread to a greater extent over the succeeding turns of the threads, as shown by the dash-dot line 15 of FIG. 2. Additionally, because more of the load is sustained by more of the turns of the threads adjacent surfaces 8, 9, an increased length and therefore volume of the male member is compressed and a correspondingly increased length and therefore volume of the female member is tensioned, so that a greater amount of energy is stored in the free end portion of the male member and in the corresponding portion of the female member, and the members will have been rotated through a substantially greater angle to achieve loading of the surfaces 7, 8. Additionally, because the maximum load on the leading flanks of the turns of the threads is substantially reduced as compared with the maximum load per turn in the known connector, the risks of galling of the thread surfaces are correspondingly reduced.

The threads 4, 6 of the connector of FIG. 3 may be dimensioned to have an interference fit between the crest surface of one of the threads and the root surface of the gap between adjacent turns of the other thread, but the degree of interference can be substantially reduced as compared with that of a known connectors in accordance with FIG. 1, because of the reduced tendency to unscrewing or back-off resulting from the increased stored energy. Preferably, there is at least contact between the crest surface of one thread and the root surface of the gap between adjacent turns of the other thread, but a clearance may be provided.

When the members of the connector of FIG. 3 are fully engaged, if the connector is not subject to any axial tensile forces, the turns 4j, 6j, 4i, 6i etc. at the other end of the threaded surfaces have little effect. However, if the connector is subject to a tensile force, a substantial part of the load is, in the known connector, borne by the turns of the threads adjacent the other end. To reduce the load sustained by end thread turns 4j, 6j and spread the load over the other turns, the axial thickness of the turns of one or both of the threads in this end portion may also be reduced, the reduction in thickness being greatest in the end turn and progressively reducing in the direction of the one end of the threaded surfaces. As shown in FIG. 3 this reduction in axial thickness is applied to thread 4. As with thread turns 4a, 4b etc. the pitch of the leading flanks 9 is maintained constant and material is removed from the trailing flanks 13 to provide these flanks with a pitch which is constant but larger than that of the pitch of the load bearing flanks. The pitch difference may be the same as or smaller than the difference in the pitches of the leading and trailing flanks of thread turns 4a, 4b etc. at the other end of the threaded surface of the male member 1.

The effect of this reduction in axial width of thread turns 4j, 4i, 4h and 4g, as shown in FIG. 3, is the same as with thread turns 4a, 4b etc., that turn 4j will flex to transmit more load to turn 4i etc., as shown by the full line 16 in FIG. 2.

Figure 4:
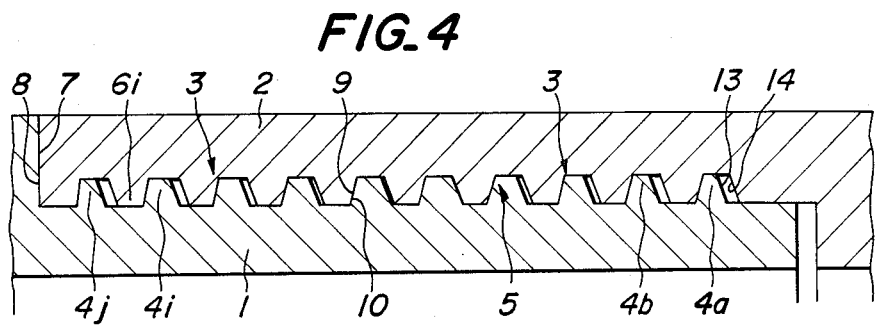
FIG. 4 is a diagrammatic part sectional view of another embodiment of pipe connector according to the present invention.

While in the above described connector, the sealing surfaces 7, 8 are provided at the free end of the male member 1 and internally in the female member 2, they may alternatively be provided between the free end of the female member and externally on the male member, as shown in FIG. 4. In FIG. 4 like parts have been given the same reference numerals. However in the embodiment of FIG. 4, the axial width of the thread turns of thread 4 of male member 1 have again been reduced at the two ends of the threaded surface, although as mentioned above, the reduction in axial width of the threads can be applied equally to the thread of the female member or indeed to both threads, the reduction being obtained by appropriately cutting away the trailing flank surfaces while maintaining a constant pitch for the leading flank surfaces of the thread.

Figure 5:
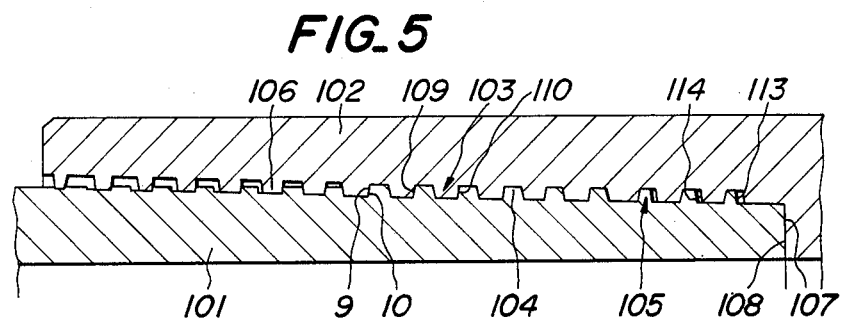
FIG. 5 is a part sectional view of yet another embodiment of pipe connector according to the present invention.

FIG. 5 shows more realistically the female member 102 and the male member 101 of a preferred pipe connector of the type shown in FIG. 6, in which the female member 102 is provided by a sleeve 130 having a female member 102 at each end, each for engagement with a male member 101 which is made or formed integrally with a respective pipe 131. As shown in FIG. 5, the male member 101 has a radial sealing surface 107 at its free end and a thread 104 formed on its external circumferential frusto-conical surface 103. The thread comprises sixteen turns having leading flanks 109 which have a constant pitch throughout the axial extent of the thread 104, and trailing flanks 113. The five turns of the thread 104 of the male member adjacent surface 107 have a reduced axial width providing these turns with trailing flanks 113 which have a smaller pitch than the pitch of leading flank 109. Over the remainder of the thread, the pitch of the trailing flanks of the turns is the same as that of the leading flanks. The thread 104 is a buttress thread which has a "vanishing" portion adjacent the root or inner end of the male member, in this portion, the crest surfaces of the turns of the thread lie on a cylinder. The crest surfaces of the remainder of the turns of the thread lie on a frusto-conical surface, as do all the root surfaces between adjacent turns of the thread, these frusto-conical surfaces having the same cone angle.

As regards the female member 102, it is provided with a radial sealing surface 108 and a circumferential internal frusto-conical surface 105 which is provided with a buttress thread 106 having, as with the thread of the male member, sixteen turns of which the leading flanks 110 have a constant pitch which is the same as that of the leading flank 109 of the thread of the male member. The last five turns of thread 106 adjacent the free end of the female member (i.e. remote from the sealing surface 108) have a reduced axial width so that, in this portion, the pitch of the trailing flanks 114 of these turns is smaller than the pitch of the trailing flanks of the remainder of the turns of the thread, which latter pitch is the same as the pitch of the leading flanks 110 of the turns. The thread 106 has a constant radial extent throughout, the crest and root surfaces lying on frusto-conical surfaces having the same conicity as the frusto-conical surfaces of the male member.

In manufacturing the threads 104, 106 of the members of the connector of FIG. 5, both threads are made with the same and a constant pitch leading and trailing flanks using e.g. full width cutting tools. The same or a different cutting tool is then used to cut away the trailing flanks of the thread turns adjacent the free end of each member and starting at the free end. Cutting proceeds until the amount removed reduces to zero so that the trailing flanks of the thread turns of reduced axial width merge with the trailing flanks of the unreduced threads.

In a preferred form of the threads of the members of the connector, the leading flanks 109, 110 have a slight inclination, for example of the order of 3°, to the radial plane and the trailing flanks 113, 114 have a greater inclination, for example of the order of 10°.

The radial extent of one thread in relation to that of the corresponding gap between adjacent thread turns of the other thread is arranged so that there is a clearance between the crest surface of one thread and the root surface of the gap between adjacent turns of the other thread, and a clearance, contact or interference between the crest surface of the other thread and the root surface of the gap between adjacent turns of the one thread. Where contact or interference is required but one of the threads "vanishes" at one end, contact or interference is advantageously provided between the crest surface of the other "non-vanishing" thread and the root surface of the gap between adjacent turns of the one thread with the "vanishing" portion so that contact or interference is maintained throughout the length of the threaded surfaces. In the embodiment of FIG. 5, if contact or interference is required, it is provided between the crest surface of the thread 106 of the female member and the root surface of the gap between adjacent turns of the thread 104 of the male member.

In the above described embodiments, the threaded surfaces 3, 5 and 103, 105 of the members are described as being frusto-conical. It will be appreciated that these surfaces may be cylindrical. Additionally it will be appreciated that the numbers of turns of the threads on the members will depend on the members and the loads which they have to sustain and are variable as required. Similarly, the numbers of turns of the threads whose axial thickness is reduced may be varied as required but preferably at least a third of the turns of the thread of at least one of the members are reduced in axial thickness in the region of the ends of the threaded surfaces.

While as described, the sealing surfaces 7, 8 and 107, 108 are radial surfaces, it will be appreciated that these may take other forms, the main requirement being that they be generally axially directed so as to be subject to axial forces to urge them into sealing contact. They may for example be frusto-conical surfaces or comprise two frusto-conical surfaces of opposite conicity which merge together with a generally V-section radial profile. Alternatively, they may be curved, for example convex or concave, or in part radial and/or frusto-conical and/or curved. Additionally the surfaces may initially have different shapes and, with axial compression, be deformed to the same general shape, e.g. as disclosed in our U.K. Patent Application No. 8414203. The surfaces may be provided with one or more annular grooves provided with sealing rings or may be coated with a sealing material, e.g. Teflon, to improve the seal provided thereby.

Additionally, while as described above, surface 8 and 108 on the female member is shown as being formed integrally therewith, this surface may be provided by another member which is permanently or releasably fixed to the female member. For example, as shown in FIG. 7, which shows an arrangement similar to that shown in FIG. 6, with a sleeve 130 providing two female members 102, each engageable with a male member 101, considering either of the male members 101 with a sealing surface 107, the sealing surface 108 associated with the female member may be provided by the end surface 107 of the other male member which has previously been engaged with the sleeve. In this embodiment, the sealing surfaces 7, 8, 107, 108 may have the forms described in copending U.K. Patent Application No. 8323508.

It will also be appreciated that the above described connectors are applicable to other types of pipe connectors, such as pin and box type connectors where both the male member and the female member are made or formed integrally with a pipe, and to connecting other tubular or solid elongate, e.g. cylindrical members, such for example as structural tubular members, pile driving pipe strings, drill collars and tool joints.

For use in connecting pipes for conveying pressurized fluids, such as oil or gas or steam, and in oil or gas exploration and production, the male member may be formed integrally on the end of the metal pipe and the female member may also be made of a metal and formed integrally on the end of a metal tubular member or as part of a sleeve. The metal may for example be steel, e.g. high tensile steel. Where the connector is used for conveying a corrosive fluid which contacts both members, they are advantageously both made of the same material. Where contact between the fluid conveyed and both the members does not occur, as for example in the embodiment of FIG. 7, the material of the female member may be a higher grade than that used for the male member so that the overall dimensions of the female member can be reduced.

Although as described above, each member is provided with a single start thread, the members may be provided with multistart threads. Additionally, although the threads illustrated are buttress threads, it will be appreciated that other suitable forms of threads may be used.

What is claimed is:

1. A pipe connector comprising a female member having an internal circumferential surface provided with a thread, and a male member having an external circumferential surface provided with a thread for threaded engagement with the thread of the female member, the male member being provided adjacent one end of the threaded surface thereof with an annular facing axially sealing surface which is, when the male and female members are fully engaged together with part of at least of one leading flank of each thread in load bearing abutment with a corresponding leading flank of the other thread, brought into abutment with an annular facing axially sealing surface associated with the female member under an axially directed force, wherein the pitches of the leading flanks of the threads are the same and constant throughout the axial extents of the threads and the axial thickness of the thread of at least one of the members in one end portion of the thread adjacent the sealing surfaces thereof is reduced relative to the axial thickness of the thread of the other member adjacent the end portion to increase the flexibility of the reduced thread.

2. A pipe connector as set forth in claim 1, wherein the axial thickness of the reduced thread of the one member is smallest at the end of the thread adjacent the seating surface and progressively increases in the direction of the other end of the thread.

3. A pipe connector as set forth in claim 1, wherein in the one end portion the axial thickness of the threads of both members are reduced.

4. A pipe connector as set forth in claim 1, wherein the one end portion is adjacent a free end of one of the members and the thread in the one end portion of that one member is reduced in axial thickness.

5. A pipe connector as set forth in claim 1, wherein the axial thickness of the thread of at least one of the members in the other end portion of the thread thereof remote from the sealing surface thereof is reduced to increase the flexibility of the reduced thread.

6. A pipe connector as set forth in claim 5, wherein the axial thickness of the reduced other end portion of the thread of the one member is smallest at the end of the thread and progressively increases in the direction of the sealing surface.

7. A pipe connector as set forth in claim 5, wherein in the other end portion the axial thickness of the threads of both members is reduced.

8. A pipe connctor as set forth in claim 7, wherein the other end portion is adjacent a free end of one of the members and thread in the other end portion of that one member is reduced in axial thickness.

9. A pipe connector as set forth in claim 8, wherein the axial thickness of the thread of the male member in the end portion adjacent the free end thereof is reduced, the remainder of the thread thereof having a constant axial thickness, and the axial thickness of the thread of the female member in the end portion adjacent the free end thereof is reduced, the remainder of the thread of the female member having a constant axial thickness.

10. A pipe connector as set forth in claim 1, wherein the reduction in axial thickness of the reduced thread is obtained by providing the trailing flanks of the reduced thread with a pitch which is different from that of the leading flanks of the thread.

11. A pipe connector as set forth in claim 1, wherein the thread of the one member is formed with leading and trailing flanks of the same and constant pitch throughout the axial extent of the thread and material is then removed from the trailing flanks of the reduced thread to provide the reduction in axial thickness.

12. A pipe connector as set forth in claim 1, wherein the trailing flanks of the reduced thread merge with the trailing flanks of adjacent thread 13. A pipe connector as set forth in claim 1, wherein the circumferential surfaces of the members are cylindrical.

14. A pipe connector as set forth in claim 1, wherein the circumferential surfaces of the members are frusto-conical, the frusto-conical surface of the male member tapering outwardly thereof and the frusto-conical surface of the female member tapering inwardly thereof.

15. A pipe connector as set forth in claim 1, wherein the sealing surface associated with the female member is provided by a surface of the female member itself.

16. A pipe connector as set forth in claim 1, wherein the sealing surface associated with the female member is provided by a surface of another member engaged with the female member.

17. A pipe connector as set forth in claim 1, wherein the sealing surface of the male member is provided in the region of a free end thereof and the sealing surface associated with the female member is provided internally thereof.

18. A pipe connector as set forth in claim 1, wherein the sealing surface of the male member is provided by an external surface on the male member and the sealing surface associated with the female member is provided by a surface of the female member in the region of a free end thereof.

19. A pipe connector as set forth in claim 1, wherein the threads of the members are shaped to provide, on full engagement of the members, clearance between the crest surface of each thread and the corresponding root surface of the gap between the turns of the threads.

20. A pipe connector as set forth in claim 1, wherein the threads on the members are shaped to provide, on full engagement of the members, contact between the crest surface of one of the threads and the root surface of the gap between the turns of the other thread, and clearance between the crest surface of the other thread and the root surface of the gap between the turns of the one thread.

21. A pipe connector as set forth in claim 1, wherein the threads of the members are shaped to provide, on full engagement of the members, an interference fit between the crest surface of one of the threads and the root surface of the gap between the turns of the other one of the threads, and a clearance between the crest surface of the other thread and the root surface of the gap between the turns of the one thread.

22. A pipe connector as set forth in claim 6, wherein in the other end portion, the axial thicknesses of the turns of the threads of both members are reduced.

* * * * *